United States Patent [19]

Heatherly

[11] Patent Number: 5,290,166
[45] Date of Patent: Mar. 1, 1994

[54] PLASTIC PIPE BENDER AND END SOCKET FORMER

[76] Inventor: Galen K. Heatherly, 2426 E. Westcott Ave., Visalia, Calif. 93292

[21] Appl. No.: 974,796

[22] Filed: Nov. 12, 1992

[51] Int. Cl.$^5$ ............................................. B29C 53/08
[52] U.S. Cl. ...................................... 425/173; 72/369; 72/380; 264/339; 269/45; 269/74; 425/392
[58] Field of Search ............... 425/173, 392; 264/339; 72/304, 310, 369, 380, 384; 269/37, 45, 58, 59, 74, 76

[56] References Cited

U.S. PATENT DOCUMENTS

| | | | |
|---|---|---|---|
| 2,898,970 | 8/1959 | Testo | 72/304 |
| 3,072,396 | 1/1963 | McBurney | 269/45 |
| 3,466,707 | 9/1969 | Click et al. | 425/392 |
| 3,776,539 | 12/1973 | Curtis et al. | 269/81 |
| 3,878,720 | 4/1975 | Stange et al. | 72/310 |
| 3,884,612 | 5/1975 | Parmann | 425/392 |
| 4,156,588 | 5/1979 | Miller et al. | 425/392 |
| 4,158,586 | 6/1979 | Usui | 264/339 |
| 4,273,523 | 6/1981 | Levens | 425/326.1 |
| 5,129,636 | 7/1992 | Bridgstock | 269/45 |

Primary Examiner—Jay H. Woo
Assistant Examiner—Robert B. Davis
Attorney, Agent, or Firm—David Pressman

[57] ABSTRACT

The device includes a left arm (11) and a right arm (10) hingably connected about a protractor scale (12). A left clamp and a right clamp (13 and 13') are slidably attached to the arms such that the spacing between the clamps is adjustable. Locking knobs (24A, 24B, 24A', and 24B') hold the clamps at the desired locations. Left and right socket formers (29 and 29') are slidably attached to the left and right clamps, respectively. Left and right levers (34 and 34') are used to extend the socket formers into a heated pipe (37) placed between the clamps to form integral pipe connecting sockets in the ends of the pipe. (A flexible mandrel is placed inside the pipe to prevent it from collapsing). Bending the arms to a desired angle on the protractor will bend the pipe to the same angle. Locking knob (18) holds the arms in place while the pipe cools. After the pipe is cooled and hardened, the levers are used to retract the socket formers from the pipe to release the pipe.

15 Claims, 8 Drawing Sheets

PLASTIC PIPE BENDER AND END SOCKET FORMER

BACKGROUND

1. Field of Invention

This invention relates generally to devices for forming thermoplastic pipes, specifically to an improved pipe bender and end socket former.

2. Prior Art

Plastic pipes used in building construction often need to be bent to round corners and follow curves. Readymade sweep elbows or ells (curved pipe sections), which serve as curved connectors, are commercially available to suit such needs. However, such prefabricated parts are expensive, need to be stocked in a great variety of tube diameters and bend angles by contractors, and are available only in a very small number of angular configurations, i.e., 30, 45, and 90 degrees. A large inventory of sweep ells ties up much capital. Therefore, contractors sometimes use templates, or flat sheets printed with a variety of curves, to bend custom pipes in the field. A heated pipe is bent by hand and matched against the desired curve on the template. However, templates can only provide a small number of curves, and manually matching pipes against the template limits accuracy. Moreover, two connector sleeves are needed to join a sweep ell with pipes at either end, which increases the cost.

Some pipe bending jigs have been designed to allow more accurate pipe forming in the field. U.S. Pat. No. 3,776,539 to Curtis et al. (1973) shows a jig with two hinged arms, each with clamps at their ends, and a protractor to show the angle of the arms. The arms are first adjusted to the desired angle, then the heated pipe is bent and placed into the clamps. Some versions of this jig cannot form more complex shapes, such as S curves, and it has no provision to prevent the pipe from kinking when bent to a small radius. As a result, the sweep elbows it produces do not conform to the National Electrical Manufacturers Association (NEMA) standard for maximum allowable deformation (internal and external diameters—ID and OD). Moreover, the resulting sweep ell still requires the use of connector sleeves.

U.S. Pat. No. 4,156,588 to Miller et al. (1979) shows a jig with two clamps slidably mounted on a rod, and protractors on each clamp to show the angle of the bend. Plugs seal the ends of the pipe to maintain internal pressure to prevent kinking. However, this jig is inconvenient because it requires the clamps to be individually adjusted for each bend radius and angle. Furthermore, the resulting sweep ell also requires the use of connector sleeves. Also, Miller's jig is designed to form bends in pipes having diameters of about 5 cm or greater.

U.S. Pat. No. 4,273,523 to Levens (1981) shows a sweep ell production device which automatically bends pipe sections by feeding the pipe section from an extruder into a curved forming sleeve. It can only be used with production pipe extruders; not in the field. Furthermore, the resulting sweep ells also require the use of connector sleeves.

In conclusion, pipe bending in the field can be difficult. Templates are limited in their scope and accuracy, while existing jigs are either limited in the shapes they can form, or very inconvenient in their use, and lack any internal pipe support so that the resultant bent pipes do not comply with the NEMA standard for permissible deformation. Furthermore, pipe sections produced by these jigs require the use of connector sleeves, which increase cost.

OBJECTS AND ADVANTAGES

Accordingly, several objects and advantages of the invention are to provide a pipe bender for use in the field which is accurate, which can form pipes into any angle between 0 and 90 degrees without kinks, which can accommodate pipes of various diameters, which can form pipes into irregular shapes, which can form the ends of pipe sections into integral connector sockets to eliminate conventional, separate, connector sleeves, which is easy to use and adjust, which is compact, light, and easy to carry, and which is simple and economical to manufacture, which can make compression-formed connector sleeves (couplings), and which can form elbows which comply with applicable standards for deformation (ID and OD) and minimum radius of bend to centerline of conduit.

Further objects and advantages will become apparent from a study of the following description and the accompanying drawings.

| Drawing Reference Numerals | |
| --- | --- |
| 10. Right Arm | 11. Left Arm |
| 12. Protractor | 13. Clamp |
| 14. Carrying Handle | 15. Base Plate |
| 16. Top Plate | 17. Pivot |
| 18. Locking Knob | 19. Threaded Stud |
| 20. Circular Slot | 21. Angle Scale |
| 22. Pointer | 23. Grip |
| 24. Locking Knobs | 25. Threaded Studs |
| 26. Slot | 27. Notch |
| 28. Scale | 29. Socket Former |
| 30. Rod | 31. Bolt |
| 32. Nut | 33. Vertical Plate |
| 34. Lever | 35. Connector Bar |
| 36. Rivet Nut | 37. Pipe |
| 38. Mandrel | 39. Measuring Tab |
| 40. Sleeves | 41. Short Portion |
| 42. Pivot | 43. Pivot |
| 44. Pivot | 45. Socket |
| 46. Short Slot | 47. Threaded Rod |
| 48. Rivet Nut | 49. Plate |
| 50. Cavity | |

DESCRIPTION

Figure 1A:
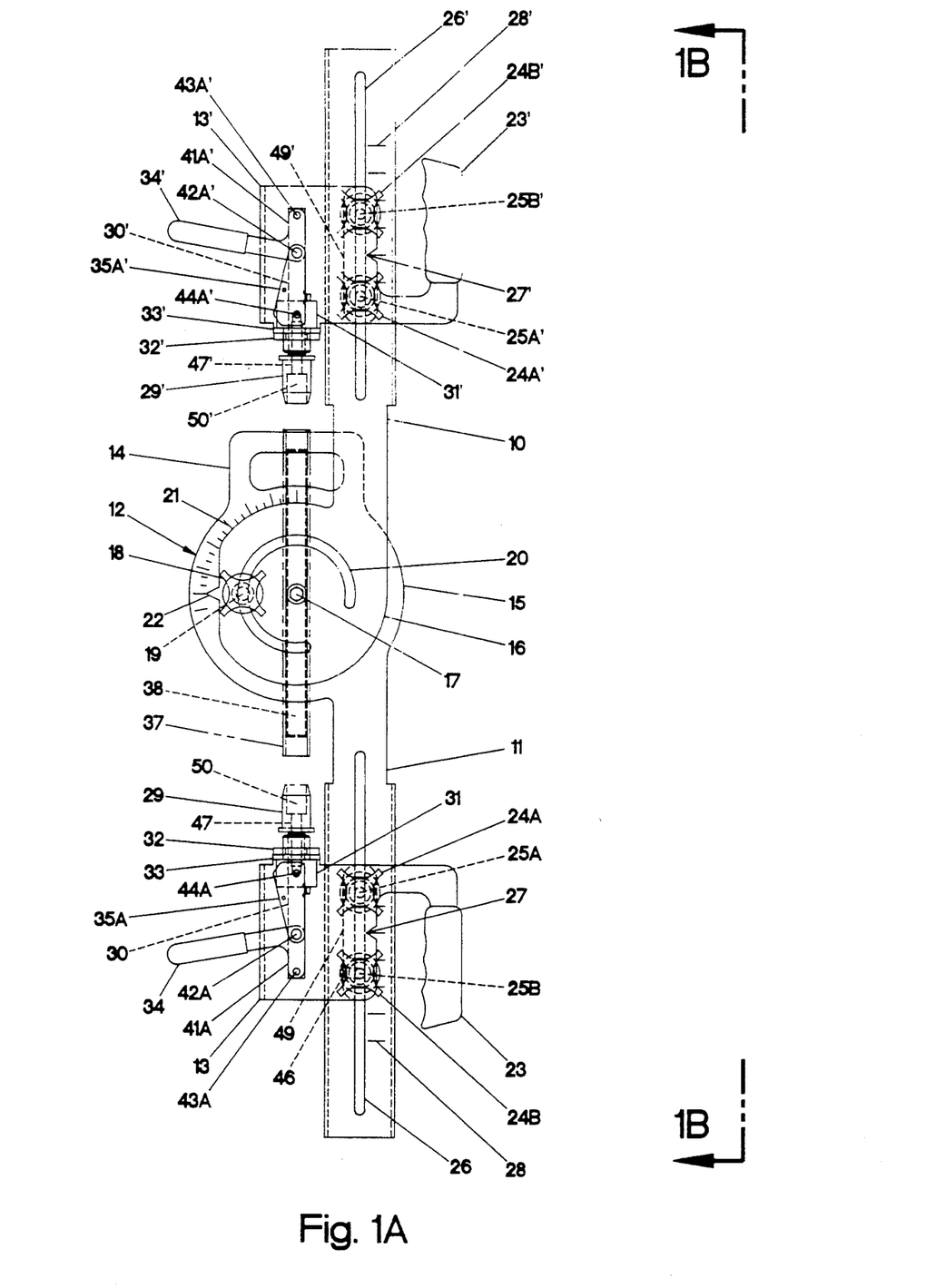
FIG. 1A is a top view of a pipe bender and end socket former in accordance with a preferred embodiment of the invention.
Figure 1B:
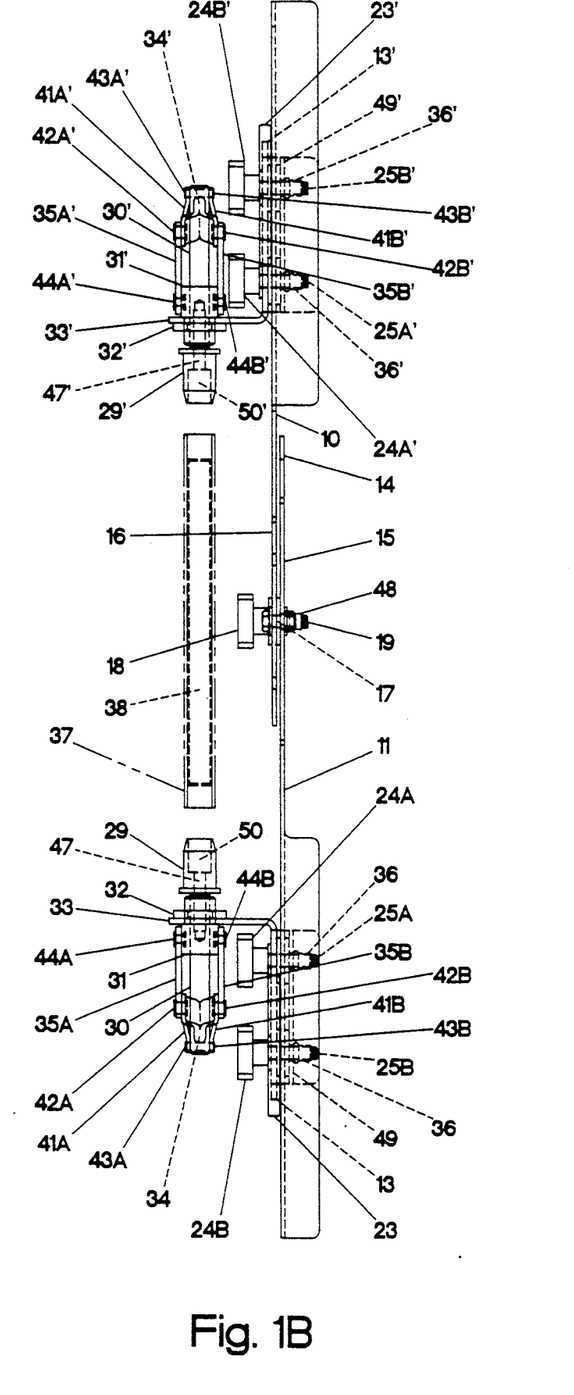
FIG. 1B is a front view of the pipe bender of FIG. 1A.

FIGS. 1A and 1B

In accordance with a preferred embodiment of the invention shown in FIGS. 1A (top view) and 1B (front view), a plastic pipe bender and end socket former generally comprises a right arm 10, a left arm 11, and a protractor 12 between the arms. A left clamp 13 is slidably mounted on left arm 11, while a right clamp 13' is slidably mounted on right arm 10.

Referring to FIG. 1A, the pipe bender and end socket former will now be explained in detail. Protractor 12 comprises a base plate 15 integral to the inner end of left arm 11, and a top plate 16 integral to the inner end of right arm 10. The plates are hingably jointed at a central pivot 17. At the 12 o'clock position of base plate 15 is mounted a plastic locking knob 18, the threaded stud 19 of which goes through a circular slot 20 in top plate 16 to screw into a rivet nut 48 (FIG. 1B). Circular slot 20 extends clockwise from about the 9 o'clock position of top plate 16 to about the 6 o'clock position. Base plate 15 has an angular scale 21 at its upper right quadrant reading from −10 to +90 degrees in 5-degree increments. Top plate 16 has a pointer 22 at its top edge for indicating the angular position of arms 10 and 11 on scale. The pipe bender is shown positioned at 0 degrees. An integral carrying handle 14 extends from the right side of base plate 15.

Left clamp 13 is a "g" shaped plate with a vinyl coated grip 23. Two plastic locking knobs 24A and 24B are mounted on the lower edge of the main portion of left clamp 13. The knobs are mounted on threaded studs 25A and 25B, respectively. These threaded studs extend through clamp 13, a left slot 26 in left arm 11, and a plate 49 to allow left clamp 13 to be positionable along the length of the arm. Slot 26 is slightly larger than the diameters of threaded studs 25A and 25B so that the threaded studs may move freely along slot 26, which spans most of the length of arm 11. Threaded stud 25B extends through the lower end of a short slot 46 in clamp 13. Rivet nuts 36 and plate 49 on the lower side of arm 11 (FIG. 1B) hold threaded studs 25A and 25B in slot 26. A notch 27 on the lower edge of the main portion of left clamp 13 shows the linear position of the clamp along a linear scale 28 on the lower edge of left arm 11.

Right clamp 13' is a mirror image of left clamp 13, and has a similar grip 23', locking knobs 24A' and 24B', threaded studs 25A' and 25B', plate 49', rivet nuts 36', and notch 27'. Right clamp 13' is also slidably mounted on a slot 26' in right arm 10, which has a scale 28' mirrored against left scale 28. Right clamp 13' does not have a short slot 46.

Left socket former 29, a round plug made of anodized aluminum coated with PTFE, and having a central cavity 50, is mounted on a threaded rod 47 at the inner end of a rod 30. The main body of socket former 29, which has a diameter at its proximal end slightly larger than the outer diameter of plastic pipe 37, tapers very slightly until it terminates in a sharply tapered distal end with a diameter slightly smaller than the inner diameter of pipe 37. Rod 30 is slidably and horizontally mounted in a large, hollow bolt 31, which is in turn mounted by a nut 32 through a left vertical plate 33 (FIG. 1B) extending integrally from the upper right of left clamp 13. The upper side of the outer end of rod 30 is connected by pivot 43A to the distal end of short portion 41A of lever 34 (FIG. 1A), which is in the shape of a reversed "L". The lower side of the outer end of rod 30 is connected by pivot 43B to the distal end of short portion 41B of lever 34 (FIG. 1B). The upper side of the bend of lever 34 is connected by pivot 42A to the distal end of a connector bar 35A, while the lower side of the bend of lever 34 is connected by pivot 42B to the distal end of a connector bar 35B (FIG. 1B). The inner end of connector bar 35A is connected by pivot 44A to the top side of bolt 31 (FIG. 1A), while the inner end of connector bar 35B is connected by pivot 44B to the bottom side of bolt 31 (FIG. 1B). Left socket former 29 is shown in the fully retracted position.

A right socket former 29' and its associated mechanism, which includes cavity 50', rod 30', bolt 31', nut 32', lever 34', connector bars 35A' and 35B', short portions 41A' and 41B', and pivots 42A', 42B', 43A', 43B', 44A' and 44B', are mirror images of left socket former 29 and its associated mechanism. Bolt 31' is mounted on a right vertical plate 33' extending from the upper left of right clamp 13' (FIG. 1B).

Except as noted, the components of the bender are made of steel or aluminum.

A plastic pipe 37 is shown between socket formers 29 and 29' in both FIGS. 1A and 1B. A flexible silicone rubber mandrel 38, which is a solid rod, is positioned within the pipe. Mandrel 38 has a diameter about 10% smaller than the inner diameter of pipe 37, while also being about 37 mm shorter than pipe 37 in all cases. For other sizes of pipe, appropriate silicon rubber mandrels of other diameters are available.

DESCRIPTION

Figure 1C:
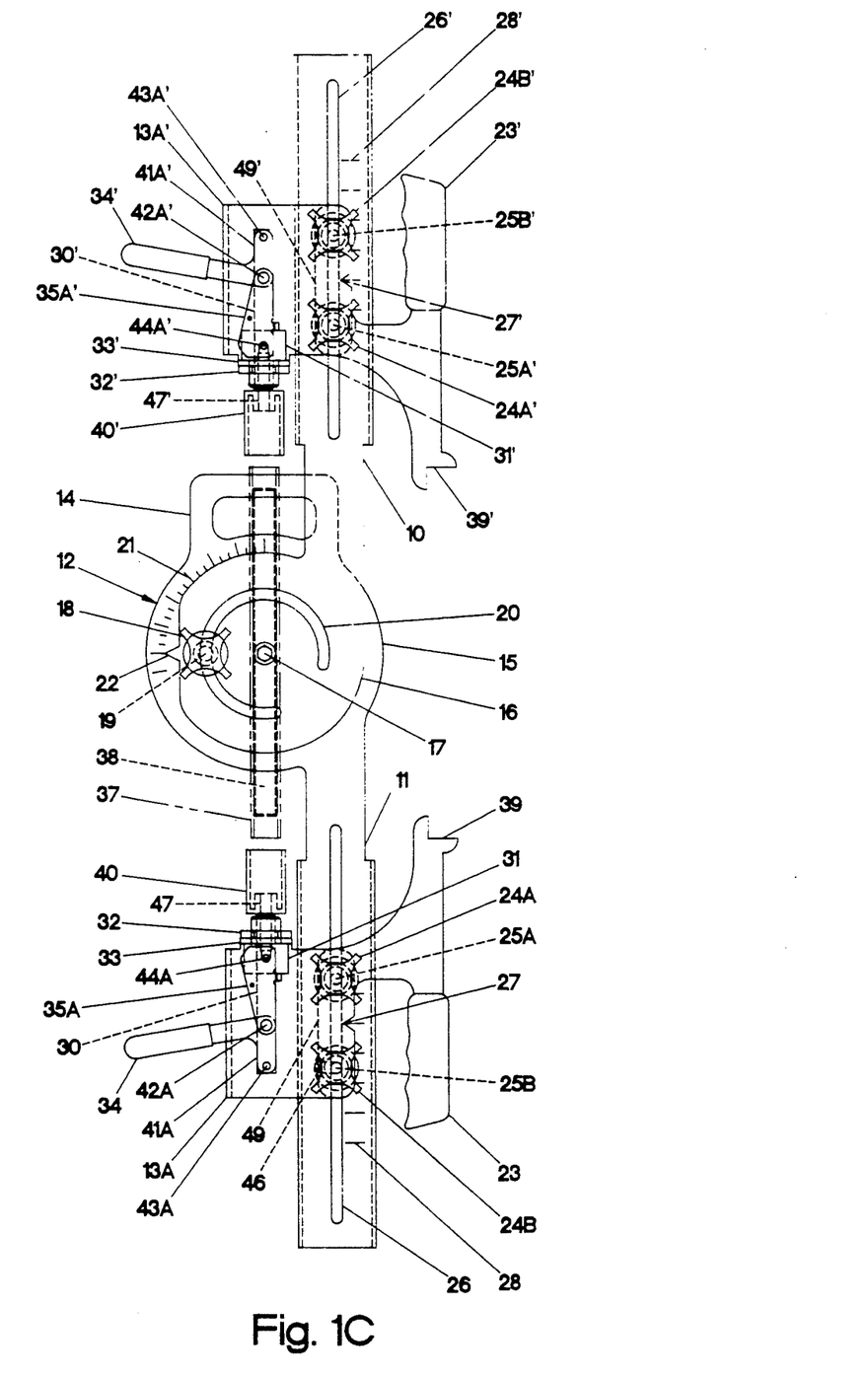
FIG. 1C is a top view of an alternate embodiment of the pipe bender of FIG. 1A.

FIG. 1C

As shown in FIG. 1C, an alternative embodiment of the pipe bender comprises a left clamp 13A with a measuring tab 39 opposite grip 23, and a right clamp 13A' with a measuring tab 39' opposite grip 23'. By positioning clamps 13A and 13A' such that notches 27 and 27' are positioned at the desired readings on scales 28 and 28', the distance between tabs 39 and 39' can be used to measure a length of pipe to be cut and bent.

Sleeves 40 and 40', which fit over the distal ends of pipe 37, may be used as alternatives to socket formers 29 and 29' (FIGS. 1A and 1B).

DESCRIPTION

Figure 2:
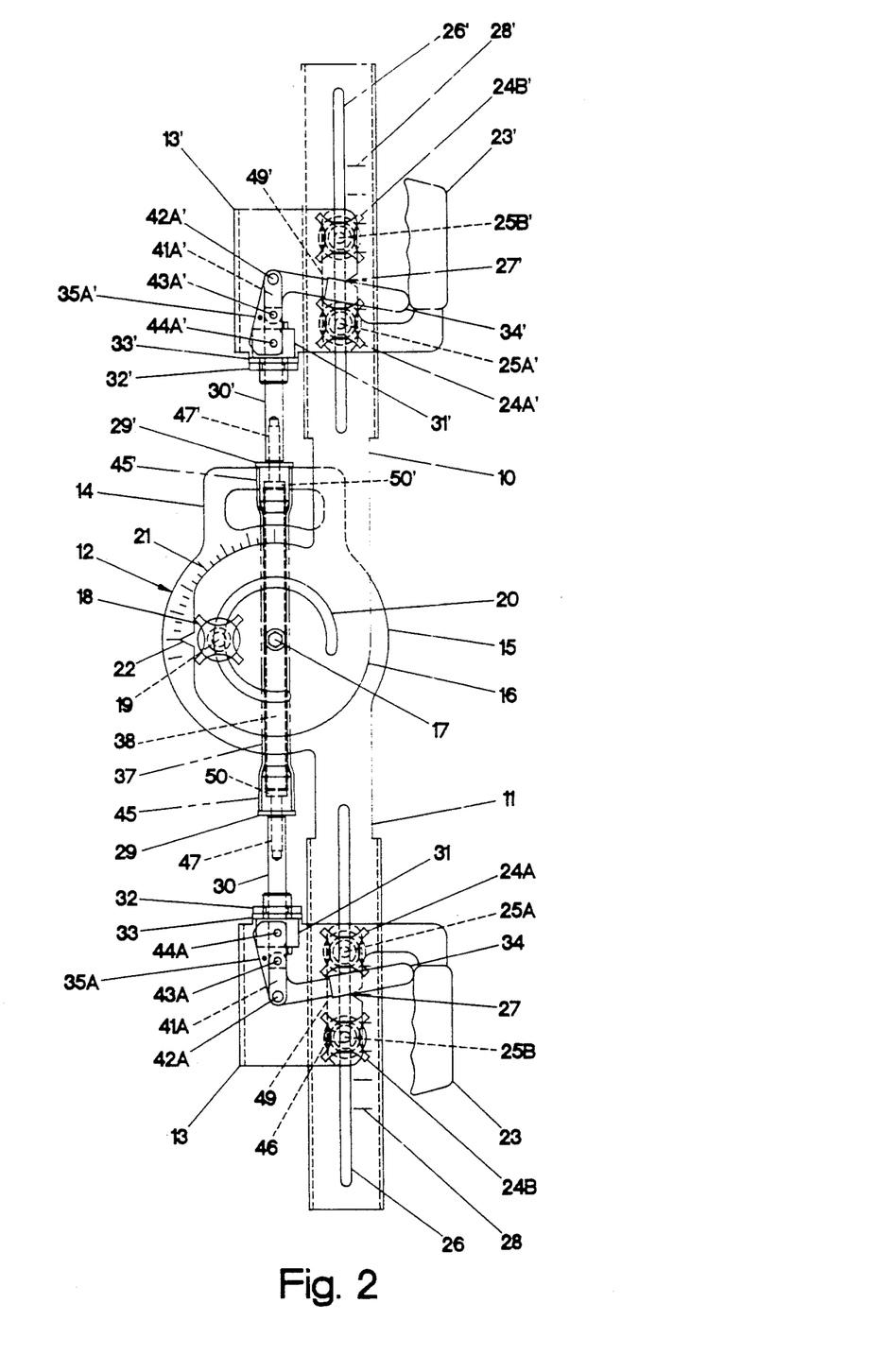
FIG. 2 is a top view of a plastic pipe clamped in the pipe bender of FIG. 1A.

FIG. 2

As shown in FIG. 2, a section of thermoplastic pipe 37 to be bent is heated to 121 to 148 degrees C. (250 to 300 degrees F.), at which point the pipe becomes soft enough to form. Left clamp 13 is positioned along arm 11 by loosening locking knobs 24A and 24B, moving clamp 13 to a desired spot as indicated by notch 27 and scale 28, and retightening knobs 24A and 24B. Right clamp 13' is likewise positioned along arm 10. When the clamps are properly positioned, mandrel 38 is manually inserted into heated pipe 37, which is then positioned between socket formers 29 and 29'. Lever 34 is then rotated counterclockwise about pivots 42A and 42B on connector bars 35A and 35B, respectively. As a result, short portions 41A and 41B of lever 34 are moved from the starting position on the far left of pivot 42A (FIG. 1A) to the far right of pivot 42A, as shown in FIG. 2. The distal ends of short portions 41A and 41B, which are connected to the outer end of rod 30 by pivots 43A and 43B, respectively, have pushed rod 30 fully to the right, such that left socket former 29 is fully extended. Left socket former 29 is thus pushed into the left end of pipe 37 such that the pipe end is expanded into the shape of the socket former. Right socket former 29' is simultaneously extended fully in a similar manner such that the right end of pipe 37 is also formed into a socket. The left and right ends of mandrel 38 are pushed into cavities 50 and 50' in socket formers 29 and 29', respectively.

DESCRIPTION

Figure 3A:
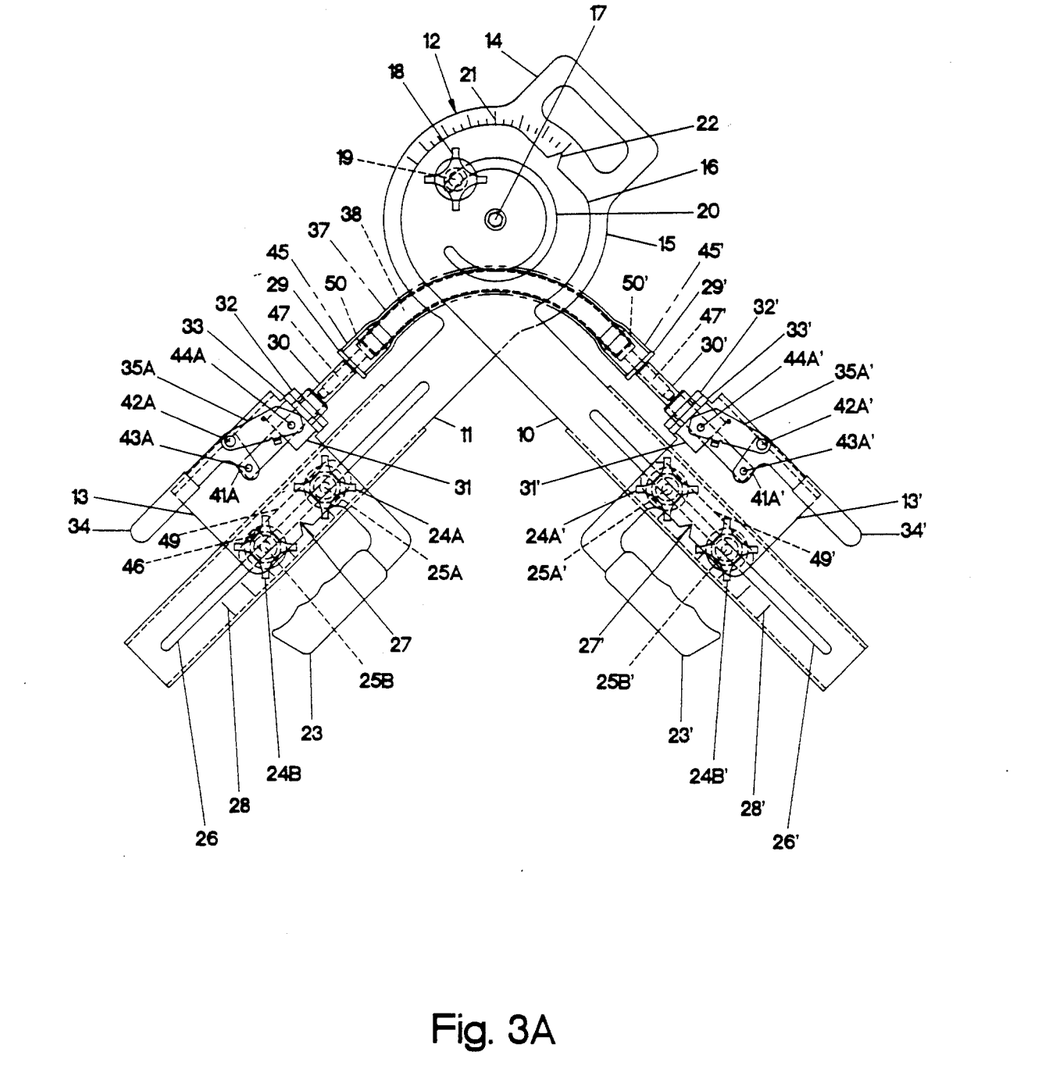
FIG. 3A is a top view of the pipe and pipe bender of FIG. 2 being bent to 90 degrees.

FIG. 3A

After pipe 37 (FIG. 2) is clamped between socket formers 29 and 29', right arm 10 is rotated about pivot 17 clockwise, while left arm 11 is rotated about pivot 17 counterclockwise to bend pipe 37 into the desired angle. As pipe 37 is being bent, lever 34 is manually rotated clockwise about pivot 42 from the position shown in FIG. 2, such that pivots 42A and 42B and the distal ends of connector bars 35A and 35B are rotated slightly clockwise about pivot 44 on bolt 31. As lever 34 is rotated, short portion 41 of lever 34 will partially retract rod 30, socket former 29, and the left end of pipe 37 to increase the bend radius of pipe 37 slightly to prevent pipe 37 from kinking. Lever 34' is simultaneously rotated counterclockwise to similarly retract the right end of pipe 37.

Arms 10 and 11 are rotated about pivot 17 until pointer 22 is at the desired reading on scale 21. Here pipe 37 is shown bent to 90 degrees. After the desired angle has been reached, locking knob 18 is tightened to prevent arms 11 and 10 from moving to allow pipe 37 to cool undisturbed and harden into a highly accurate sweep ell.

DESCRIPTION

Figure 3B:
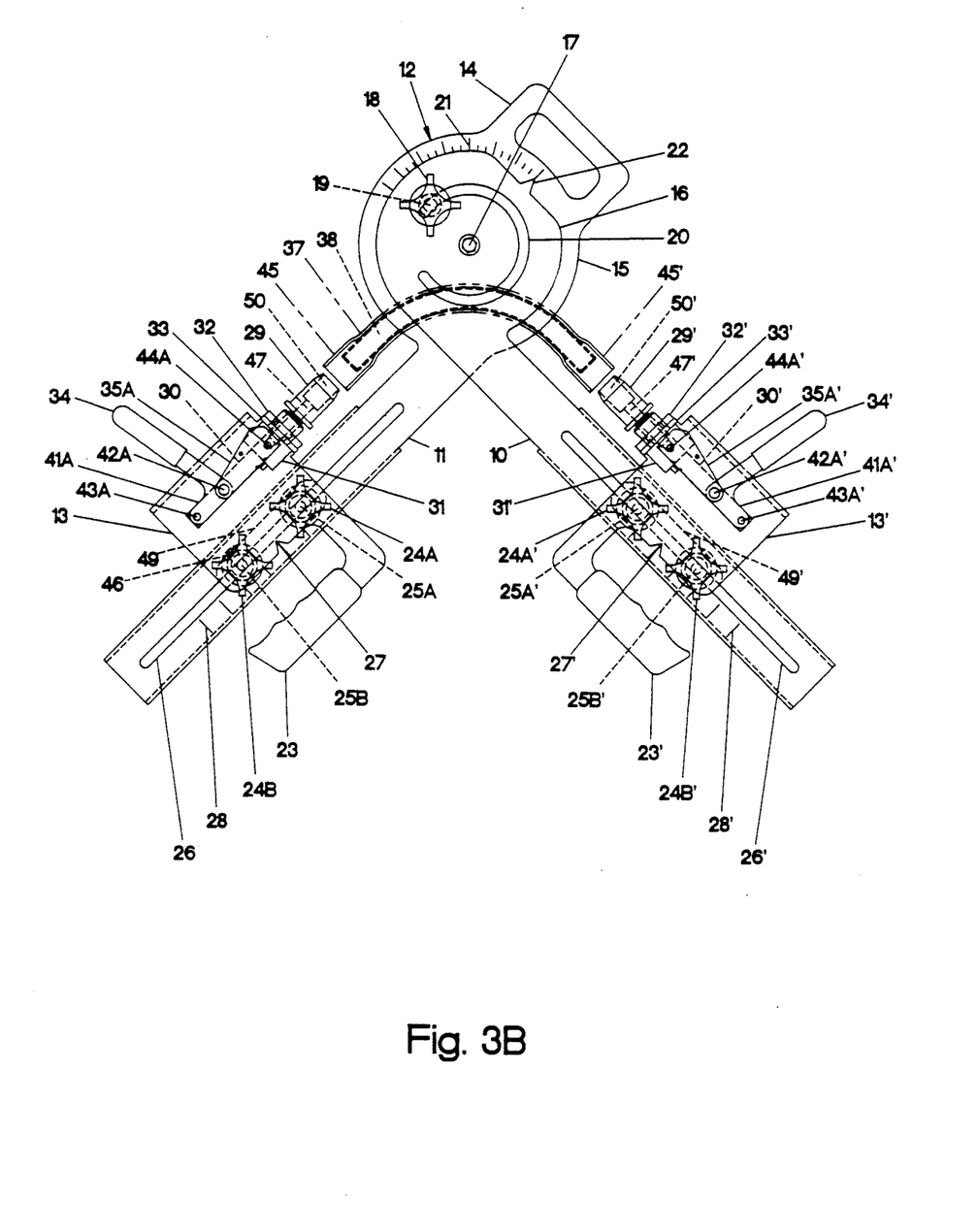
FIG. 3B is a top view of the pipe of FIG. 3A being released from the pipe bender.

FIG. 3B

After pipe 37 is bent and hardened (FIG. 3B), lever 34 is manually rotated further clockwise about pivot 42 such that the distal end of short portion 41 is rotated to the far left of pivot 42. The outer end of rod 30 is thus pulled by short portion 41 to the left most end of its travel to fully retract rod 30 and socket former 29. As lever 34 is being rotated, pivots 42A and 42B and the distal ends of connector bars 35A and 35B will rotate slightly counterclockwise about pivots 44A and 44B on the top and bottom sides, respectively, of bolt 31. Fully retracting socket former 29 will release socket former 29 from the left end of pipe 37. Lever 34' is simultaneously rotated counterclockwise such that socket former 29' is also fully retracted to release the right end of pipe 37. Mandrel 38 is removed from pipe 37. Pipe 37 has now been formed into a sweep ell with integral sockets 45 and 45', which have inner diameters about equal to the outer diameter of pipes from which pipe 37 was made. Sockets 45 and 45', the main bodies of which are slightly divergent, can therefore simply be slipped over the ends of pipes to be joined and cemented using plastic pipe cement. This eliminates the connector sleeves normally required for joining sweep ells made with conventional means to other tubing sections. Cost savings are therefore realized.

DESCRIPTION

Figure 4:
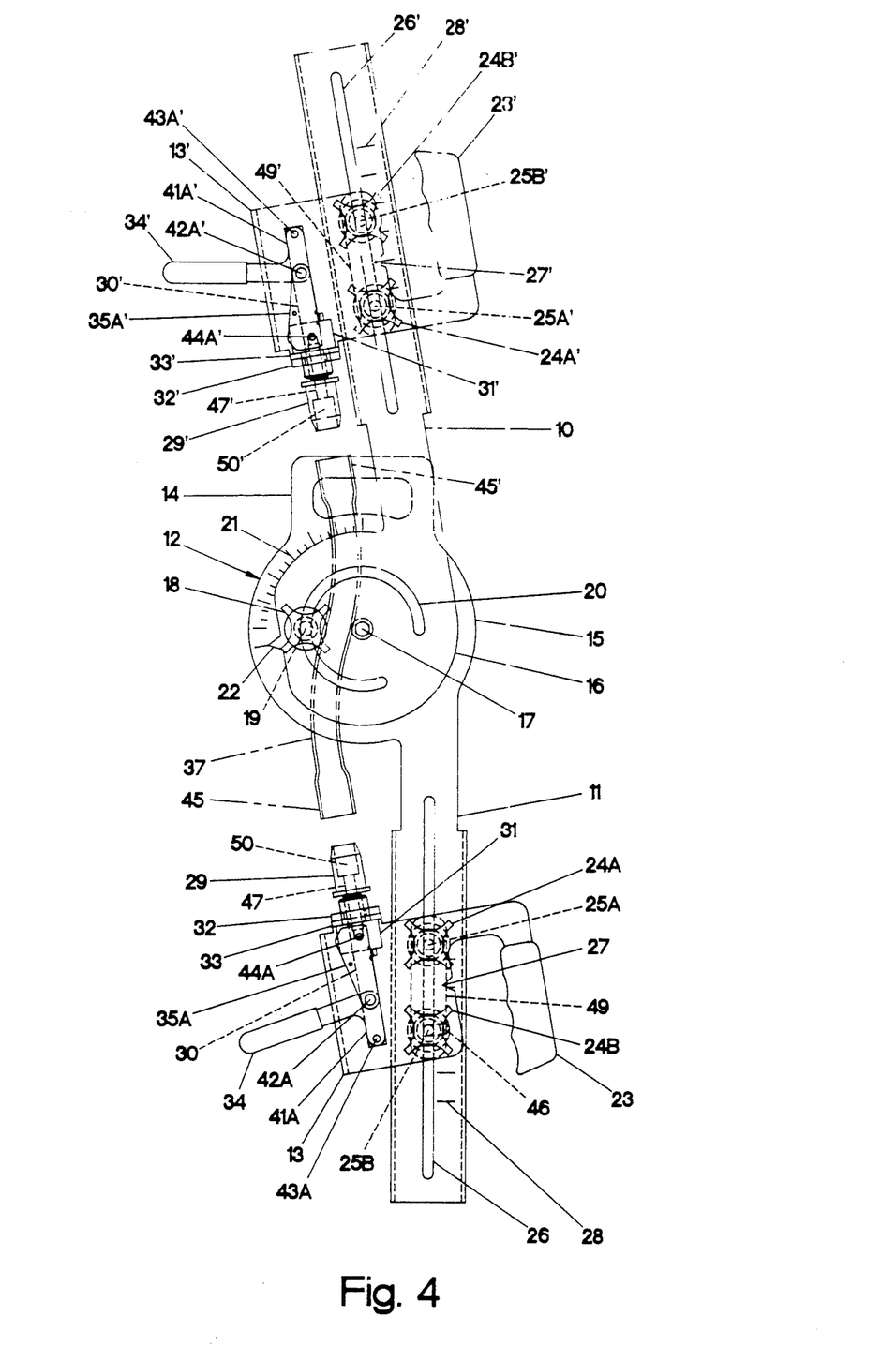
FIG. 4 is a top view of the pipe bender of FIGS. 1A and 1B configured for making an "S" bend in a pipe.

FIG. 4

In addition to regular arcs, the pipe bender can also make "S" bends. Starting with the bender in the configuration shown in FIG. 1A, locking knobs 18, 24A, and 24B are loosened. Clamp 13 is rotated counterclockwise about threaded stud 25A until the top end of short slot 46 in clamp 13 rests against threaded stud 25B. Clamp 13 is thus offset about 10 degrees. Knobs 24A and 24B are tightened to lock clamp 13 in place. Arm 10 is then rotated counterclockwise 10 degrees about pivot 17 until the axes of socket formers 29 and 29' are parallel. Knob 18 is tightened to lock arm 10 in place. The bender is now configured as shown in FIG. 4.

"S" bends can be made by first having the left end of a heated pipe 37 manually inserted onto socket former 29 to form socket 45. Lever 34 and its associated mechanisms are rotated to fully extend socket former 29, as in the description of FIG. 2. The right end of pipe 37 is manually positioned on socket former 29' so that former 29' can be extended into the pipe to form socket 45', as in the description of FIG. 2. Pipe 17 is allowed to cool and harden into its new shape, then sockets formers 29 and 29' are fully retracted to release the "S" pipe, as shown.

DESCRIPTION

Figure 5:
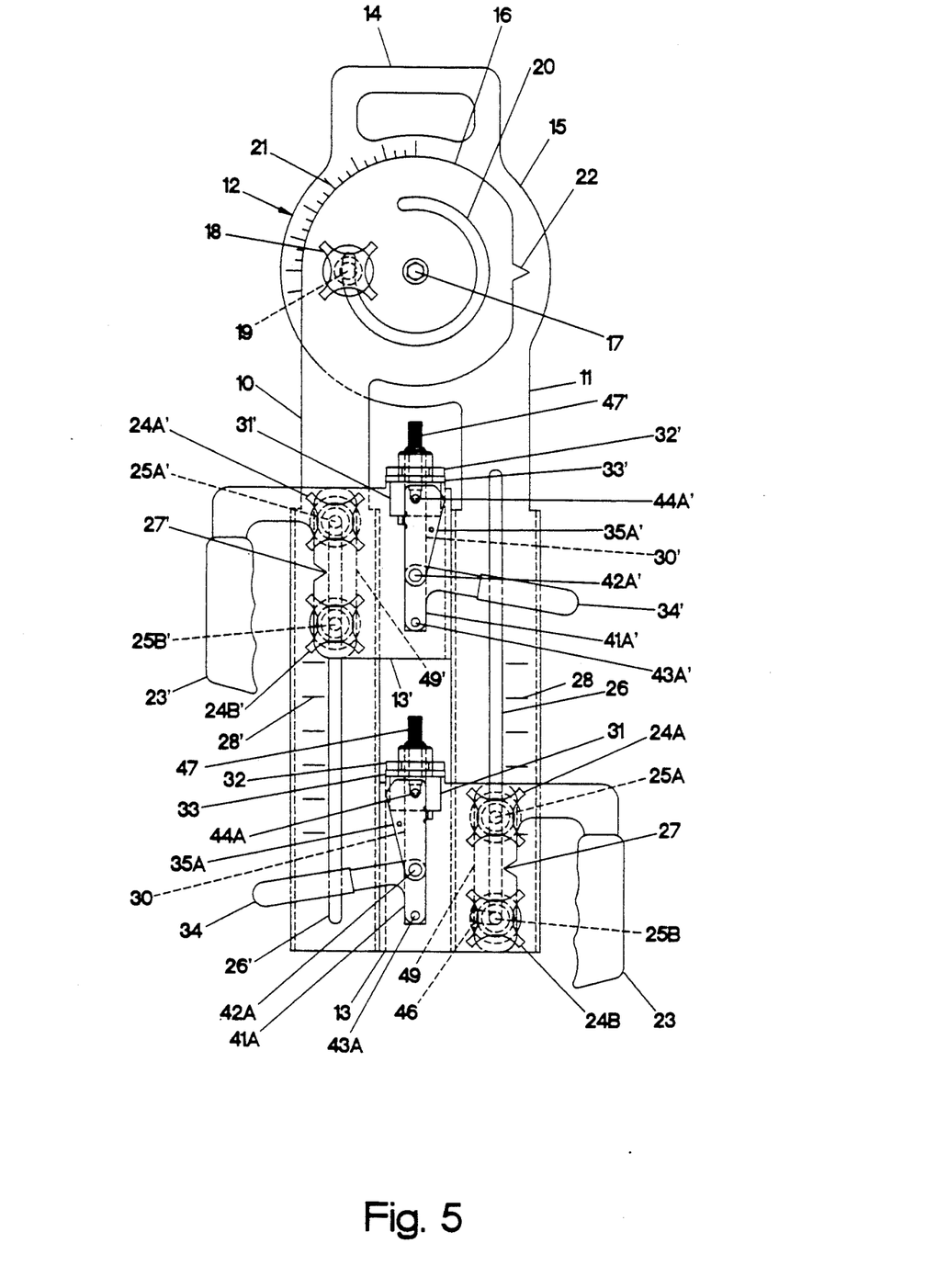
FIG. 5 is a top view of the pipe bender of FIGS. 1A and 1B being folded for transportation.

FIG. 5

The pipe bender and end socket former may be compacted for convenient transportation by loosening locking knob 18, folding arms 10 and 11 together, and tightening knob 18 to lock the arms in place, as shown in FIG. 5.

Socket formers 29 and 29' are not shown to clearly reveal threaded rods 47 and 47'. Socket formers of different diameters, each having internal threads, may be mounted on threaded rods 47 and 47' to form and bend pipes of different diameters.

In the preferred embodiment of the invention, all parts are made of steel, except and socket formers 29 and 29'—aluminum, locking knobs 18 and 24's—plastic, grips 23 and 23'—vinyl coated, and mandrel 38—silicone rubber.

SUMMARY, RAMIFICATIONS, AND SCOPE

Accordingly the reader will see that I have provided an improved pipe bender and end socket former. It may be used in the field to form accurate sweep ells of any angle between 0 and 90 degrees without kinks. It can form the ends of pipes into integral connector sockets to eliminate conventional, separate, connector sleeves. It may be used to form and bend pipes of various diameters. It may be used to form simple connector sleeves from short pipe sections without bends. It may be used to form pipes into "S" bends. It is easy to use and adjust. It is compact, light, and may be easily compacted for convenient transportation. It is simple and economical to manufacture.

While the above descriptions are specific, they should not be considered as limitations on the scope of the invention, but only as examples of the preferred embodiment. Many other ramifications and variations are possible within the teachings of the invention. For example, the components may be made of different materials. Socket formers 29 and 29' may be made of delrin, or other forms of metal treated with a slippery surface. Instead of having threads on rods 47 and 47', the rods may be smooth while employing a spring loaded ball on the side such that socket formers may snap onto the rods in a manner similar to conventional ratchet and socket sets. Hand grips 23 and 23', and handle 14 may be eliminated without any loss in the pipe bending and forming functions. Clamps 13 and 13' may each have just one locking knob 24A or 24B. Other means for locking clamps 13 and 13' may be used. Other means for extending and retracting socket formers may be used. Locking knob 18 may be eliminated such that the bender relies solely on the friction of pivot 17 to maintain position.

Thus the reader is requested to determine the scope of the invention by the appended claims and their legal equivalents, and not by the examples given.

I claim:

1. A pipe bender for bending plastic pipes of various diameters and lengths, comprising:

two arms hingeably connected together for pivoting, a protractor scale attached between said arms for indicating the angle between said arms, a pair of clamps slidably attached to said arms, said clamps being spaced apart and being adjustable in spacing so that a range of lengths of said plastic pipe may be axially clamped therebetween, and so that when said plastic pipe is heated and clamped between said clamps, said arms may be pivoted to a desired angle to bend said plastic pipe to any desired angle, and a pair of socket formers attached to said pair of clamps, respectively, for forming integral pipe-connecting sockets at the ends of said plastic pipe.

2. The pipe bender of claim 1, further including first locking means for locking said arms in any angular orientation to which said arms are pivoted.

3. The pipe bender of claim 1, further including second locking means for locking said clamps in any position to which said clamps are adjusted.

4. The pipe bender of claim 1, further including linear scales on said arms and a pair of measuring tabs attached to said pair of clamps, said scales indicating the spacing between said pair of measuring tabs, such that said measuring tabs can measure a length of said plastic pipe for cutting and bending.

5. The pipe bender of claim 1, further including a flexible mandrel having a predetermined diameter for insertion in the lumen of said pipe during bending for preventing kinking or collapse of said pipe.

6. A pipe bender for bending plastic pipes of various diameters and lengths, comprising:

two arms hingably connected together for pivoting, a protractor scale attached between said arms for indicating the angle between said arms, a pair of clamping means slidably attached to said arms, said clamping means being spaced apart and being adjustable in spacing so that various lengths of said plastic pipe may be axially clamped therebetween, and so that when said plastic pipe is heated and clamped between said clamping means, said arms may be pivoted to a desired angle to bend said plastic pipe to any desired angle, socket forming means attached to said clamping means for forming integral pipe-connecting sockets at the ends of said plastic pipe, and means for laterally offsetting each of said clamping means for forming irregular bends in said plastic pipe clamped in said clamping means.

7. The pipe bender of claim 6, further including first locking means for locking said arms in any angular orientation to which said arms are pivoted.

8. The pipe bender of claim 6, further including second locking means for locking said clamping means in any position to which said clamping means are adjusted.

9. The pipe bender of claim 6, further including linear scales on said arms and a pair of measuring tabs attached to said pair of clamping means, said scales indicating the spacing between said pair of measuring tabs, such that said measuring tabs can measure a length of said plastic pipe for cutting and bending.

10. A pipe bender for bending plastic pipes of various diameters and lengths, comprising:

two arms hingably connected together for pivoting, a protractor scale attached between said arms for indicating the angle between said arms, a pair of clamping means slidably attached to said arms, said clamping means being spaced apart and being adjustable in spacing so that various lengths of said plastic pipe may be axially clamped therebetween, and so that when said plastic pipe is heated and clamped between said clamping means, said arms may be pivoted to a desired angle to bend said plastic pipe to any desired angle, socket forming means attached to said clamping means for forming integral pipe-connecting sockets at the ends of said plastic pipe, and extending means for extending said socket forming means into said ends of said plastic pipe for forming said integral pipe connecting sockets.

11. The pipe bender of claim 10, further including first locking means for locking said arms in any angular orientation to which said arms are pivoted.

12. The pipe bender of claim 10, further including second locking means for locking said clamping means in any position to which said clamping means are adjusted.

13. The pipe bender of claim 10, further including linear scales on said arms and a pair of measuring tabs attached to said pair of clamping means, said scales indicating the spacing between said pair of measuring tabs, such that said measuring tabs can measure a length of said plastic pipe for cutting and bending.

14. The pipe bender of claim 10, further including means for laterally offsetting each of said clamping means for forming irregular bends in said plastic pipe clamped in said clamping means.

15. The pipe bender of claim 14, further including linear scales on said arms and a pair of measuring tabs attached to said pair of clamping means, said scales indicating the spacing between said pair of measuring tabs, such that said measuring tabs can measure a length of said plastic pipe for cutting and bending.

* * * * *